Patented May 25, 1943

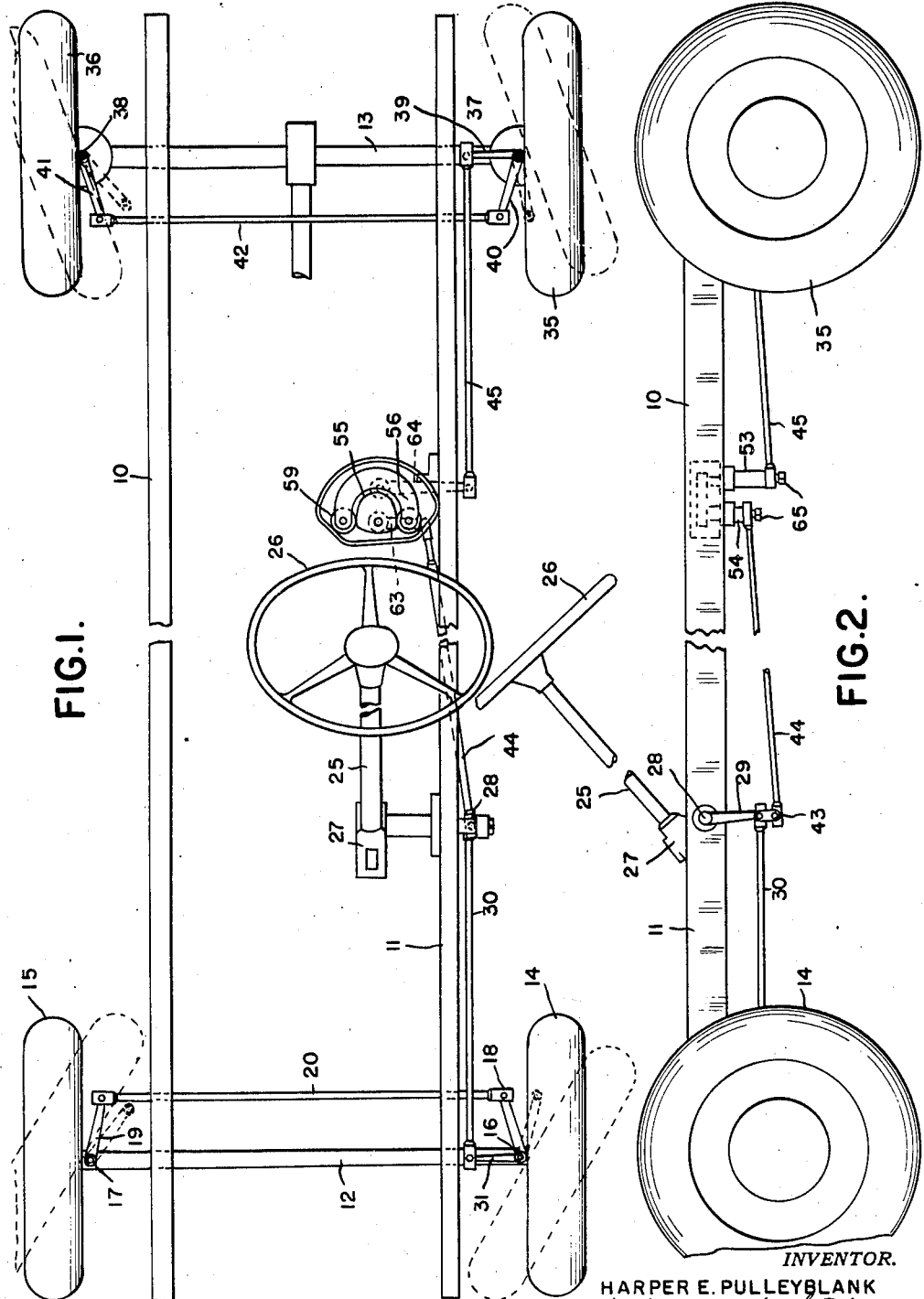

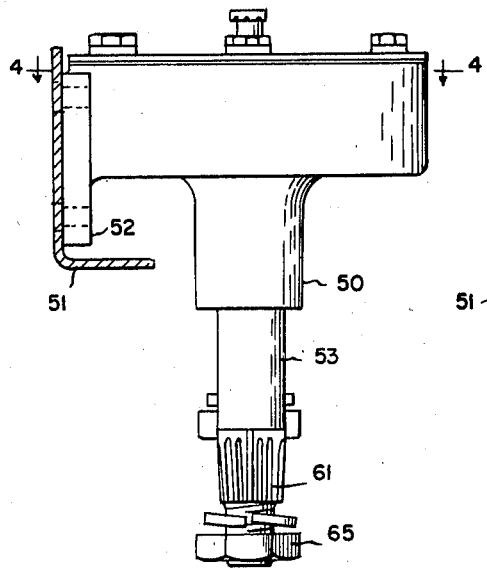
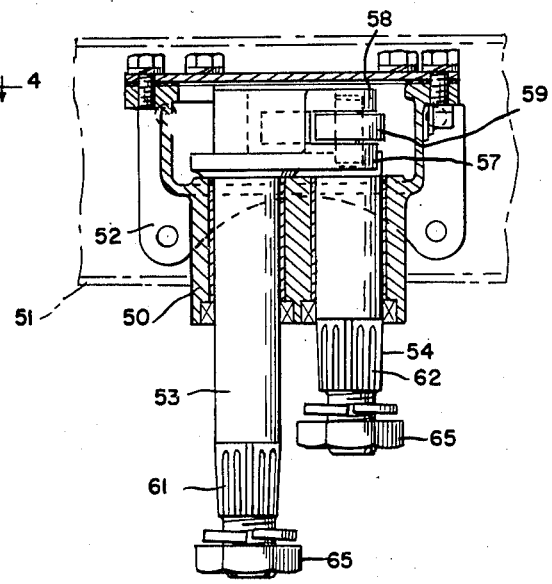
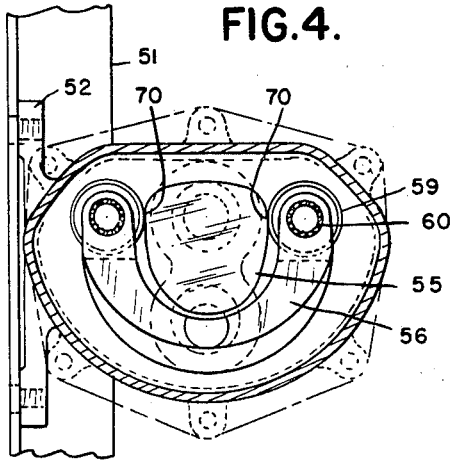

2,319,880

UNITED STATES PATENT OFFICE 2,319,880

STEERING GEAR

Harper E. Pulleyblank, Detroit, Mich., assignor to Gemmer Manufacturing Company, Detroit, Mich., a corporation of Michigan Application July 30, 1941, Serial No. 404,727

5 Claims. (Cl. 280—91)

The present invention relates to steering gears and more particularly to steering gear means for steering both the front and rear wheels of a vehicle.

The present invention finds its greatest field of utility in conjunction with relatively large, and particularly relatively long vehicles, such for example as busses or trucks. Vehicles of this type, due to their length, are difficult to maneuver due to their relatively long turning radius. According to the present invention, steering gear means are provided for steering both the front and rear wheels, and this means operates to turn both the front and rear wheels in opposite directions simultaneously.

If the steering gear means were provided to turn the front wheels and rear wheels equal amounts in opposite directions, it would be impractical to park the vehicles close to a curb, and particularly it would be impossible to draw away abruptly from the curb if closely parked thereto without causing the rear wheels to ride up over the curb. Accordingly, in the present invention, the arrangement is such that upon turning of the steering wheel from an intermediate or straight-ahead position, a turning movement is imparted to the front wheels only and the rear wheels are retained in a straight-ahead position until the front wheels have been turned through a predetermined arc. Further movement of the steering wheel in a direction to turn the front wheels further in the same direction results in turning the rear wheels in an opposite direction. As a result of this arrangement it is possible to park the vehicle, provided with steering gear means according to the present invention, close to a curb and to drive the vehicle away from the curb without the disadvantages mentioned.

Another advantageous feature of the present invention is that the steering gear does not interfere with normal driving of the vehicle on the highway. Thus, for example, under highway driving conditions, when the speed of the vehicle is normally relatively great, the steering is effected by turning the front wheels through angles of less than approximately 10° from an intermediate or straight-ahead position. The present steering gear is so arranged that the front wheels may be moved through about this arc without moving the rear wheels from their intermediate or straight-ahead position. Thus it is unnecessary for the driver of a vehicle equipped with this type of steering gear to accustom himself to any new conditions in driving the vehicle on the highway since the vehicle will operate under these circumstances precisely as do vehicles provided with conventional steering mechanism.

With the foregoing general description in mind, it is an object of the present invention to provide novel steering gear for automotive vehicles.

More specifically, it is an object of the present invention to provide differential steering for front and rear wheels of motor vehicles, particularly for large vehicles such as busses and trucks.

It is a further object of the invention to provide front and rear wheel steering on vehicles of the class described to facilitate short turns while at the same time facilitating driving away from a curb or the like.

It is a further object of the present invention to provide steering gear for the front and rear wheels of a vehicle which is effective first to turn the front wheels without turning the rear wheels and then to turn both front and rear wheels in an opposite sense upon continued turning of the steering wheel.

Other objects of the invention will be apparent as the description proceeds and when taken in conjunction with the accompanying drawings, wherein:

Figure 1 is a plan view of the frame of the motor vehicle embodying the present invention;

Figure 2 is a side elevation of the structure shown in Figure 1;

Figure 3 is a side elevation of the cam housing;

Figure 4 is a section on the line 4—4, Figure 3; and

Figure 5 is a side elevation of the structure shown in Figure 3, partly in section Referring first to Figures 1 and 2, I have indicated two longitudinal frame members 10 and 11 of an automotive vehicle, a front axle 12, and a rear axle 13. Front wheels 14 and 15 are pivoted to the front axle by means of king pins 16 and 17, the wheels being provided with steering knuckles having conventional lever arms 18 and 19 respectively. The lever arms 18 and 19 are connected by a cross link 20 to insure simultaneous turning of the front wheels 14 and 15 by the steering gear. The steering gear comprises a conventional steering column 25 in which is mounted a rotatable stem or shaft (not shown) connected to a steering wheel 26. The rotatable stem is connected by conventional means, such for example as a steering worm contained within a housing 27 which is adapted to rotate a rock shaft 28. The rock shaft 28, as best seen in Figure 2, is provided with a rock arm 29. A drag link 30 interconnects the rock arm 29 and a lever arm 31 carried by the steering knuckle which supports the wheel 14.

The structure as so far described is conventional and operates in a conventional manner. Rotation of the steering wheel 26 results in rotation of the rock shaft 28 and rock arm 29, and motion of the rock arm 29 is transmitted to the steering knuckle of the wheel 14 through the medium of the link 30 and lever arm 31.

The rear wheels 35 and 36 of the vehicle are mounted on substantially vertical king pins 37 and 38, respectively, by means of steering knuckles. The steering knuckle which supports the wheel 35 is provided with a pair of lever arms 39 and 40. The steering knuckle which supports the wheel 36 is provided with a lever arm 41. A cross link or tie rod 42 interconnects lever arms 40 and 41 to insure simultaneous turning movement of the wheels 35 and 36.

As best seen in Figure 2, the rock arm 29 is provided with means indicated at 43 for connection of a second rear drag link 44 which, in turn, is connected at its opposite end to mechanism for turning the rear wheels. This mechanism is shown generally in Figures 1 and 2, but will be described later in detail in conjunction with Figures 3 to 5. For the present it is necessary only to observe that motion of the link 44 is eventually transmitted to a second link 45, which connects to the lever arm 39 previously described.

As stated at the outset, the arrangement is such that rotation of the steering wheel 26 from a straight-ahead or neutral position, first turns the front wheels 14 and 15 through a predetermined arc and thereafter, while continuing to turn the front wheels, also turns the rear wheels 35 and 36 in the opposite direction.

Referring now to Figures 3 to 5, the mechanism for converting motion of the link 44 to a different motion of the link 45 will be described.

Secured to the frame of the vehicle is a housing 50 which is shown in Figure 3 as being bolted or otherwise secured to a frame portion 51 of the vehicle at a flange 52 formed as a part of the housing. Journaled in the lower wall of the housing 50 are a pair of shafts 53 and 54. The shaft 54 is a cam shaft and carries adjacent its upper end a cam 55 which has opposite symmetrically formed cam surfaces. The shaft 53, which is adjacent and parallel to the cam shaft 54, carries at its upper end a yoke 56. The ends of the yoke are bifurcated to provide arms 57 and 58 between which are journaled rollers 59, suitable bearings being provided as indicated at 60 in Figure 4. The lower portions of the shafts 53 and 54, as indicated at 61 and 62 respectively, are tapered and are provided with serrations for firm locking engagement with levers 63 and 64 (Figure 1). These levers are held against rotation on the serrated portions of their respective shafts by nuts 65.

The cam 55 has opposite portions 70 which are engaged by the rollers 59 when the steering wheel is in intermediate position, the portions 70 being circular arcs concentric with the axis of the cam shaft 54. Accordingly, rotation of the cam shaft 54 through an arc corresponding to the angular extent of these concentric surfaces does not move the yoke 56. The angular extent of these concentric surfaces 70 may be varied as desired, but I have found that if the angular extent of the circular arcs is such that the front wheels may be moved through an arc of 9° or 10° in either direction from straight-ahead or intermediate position, excellent results are obtained. The portions of the cam surfaces adjacent the circular arc sections 70 are shaped so as to provide a predetermined rotation of the yoke 56 in accordance with a definite rotation of the cam 55.

The lever 63, which is connected to the cam shaft 54, is connected at one end to the link 44 previously referred to so that the cam shaft will be rotated in accordance with rotation of the steering wheel 26. The lever 64, which is connected to the yoke shaft 53, is connected at one end to the link 45 previously referred to so that rotation of the yoke shaft 53 results in a corresponding turning of the rear wheels through the agency of the lever 64, link 45, and lever 39.

The cam 55 is constructed and arranged so that the rollers and followers 59 are at all times in firm guided engagement therewith. In other words, during rotation of the cam 55 in one direction so that it engages one of the rollers 59 to move the same away from the axis of the cam shaft, the other of the rollers 59 remains in guiding engagement with the opposite surface of the cam 55. Thus the rear wheels are at all times under perfect control and are rigidly held in whatever position they may occupy at any instant.

Merely by way of example, I have found that excellent results are obtained when the cam 55 is so proportioned that an initial movement of 9° or 10° of the front wheels from intermediate position results in no motion of the rear wheels. An additional movement of about 20° for the front wheels is accompanied by an equal but opposite turning of the rear wheels. Thus for example, when the front wheels are turned to an angle of 10° to the axis of the vehicle, the rear wheels will be straight-ahead. When the front wheels are turned to a maximum of about 30°, the rear wheels will be turned to a maximum of about 20° in the opposite direction. At an intermediate point, when the front wheels are turned to an angle of about 20° to the axis of the vehicle, the rear wheels will be turned to an angle of about 10° in the opposite direction.

The arrangement just described permits operation of the vehicle in the usual manner on the highway, since normally an angular movement of more than 10° will not be given to the front wheels. Therefore, under normal driving conditions the rear wheels always remain in straight-ahead position. At the same time, when it is necessary to make an abrupt turn, as for example when turning long busses or trucks into an alley or into position between parked vehicles, the added flexibility of steering comes into play. The vehicle may be parked parallel and close to a curb or loading platform in the usual manner by keeping the front wheels turned to an angle of about 10°, or less. In like manner, the vehicle may be drawn away from a parallel position close to a curb or loading platform without turning the front wheels through an angle sufficient to result in an opposite turning of the rear wheels. It will be apparent that if the front and rear wheels turn simultaneously equal amounts in opposite directions, it would be impossible to draw abruptly away from a parallel position close to a curb or loading platform since, if the front wheels were turning out to move the front end of the vehicle away from the curb or loading platform on forward movement of the vehicle, the rear wheels would be turned in and would move the rear end of the vehicle toward the curb or loading platform.

It will be understood that the specific figures for angular turning given above are by way of example only and that it may be found desirable in some cases to vary this relationship to suit particular conditions.

While I have illustrated a single form of steering mechanism, it will be understood that the specific illustration and description has been made solely to enable those skilled in the art to practice the invention, the scope of which is indicated by the appended claims.

What I claim as my invention is:

1. A motor vehicle comprising a frame, front and rear wheels on said vehicle, means mounting said front and rear wheels for turning movement about substantially vertical axes, steering knuckles for said wheels including levers for turning said wheels, a steering wheel and stem, a rock arm movable by said stem, a link connecting said rock arm to the lever of one of said front wheels, a cross link interconnecting the levers of said front wheels, a cross link interconnecting the levers of said rear wheels, means interconnecting the lever of one of said rear wheels and said rock arm for opposite turning movement of said rear wheels only after a predetermined turning movement of said front wheels, said last means including means effective to retain said rear wheels firmly in straight-ahead position during predetermined movement of said front wheels in either direction from straight-ahead position, and effective thereafter to turn said rear wheels in the opposite direction from said front wheels during further turning movement of said front wheels.

2. A motor vehicle comprising a frame, front and rear wheels on said vehicle, means mounting said front and rear wheels for turning movement about substantially vertical axes, steering knuckles for said wheels including levers for turning said wheels, a steering wheel and stem, a rock arm movable by said stem, a link connecting said rock arm to the lever of one of said front wheels, a cross link interconnecting the levers of said front wheels, a cross link interconnecting the levers of said rear wheels, means interconnecting the lever of one of said rear wheels and said rock arm for opposite turning movement of said rear wheels only after predetermined turning movement of said front wheels, said last means including a housing secured to said frame intermediate said front and rear wheels, a pair of generally parallel shafts journaled in said housing, levers on said shafts exterior of said housing, a link connecting the lever of one of said front wheels to the lever on one of said shafts, a link connecting the lever on one of said rear wheels to the lever on the other of said shafts, a cam carried by one of said shafts in said housing, a cam follower carried by the other of said shafts in said housing and continuously engaging said cam, said cam being shaped to provide turning movement to said rear wheels different in amount and opposite in direction to the turning movement of said front wheels.

3. In a vehicle, front and rear pairs of ground wheels, each wheel being mounted for angular movement about a substantially vertical axis and having an actuating rock arm therefor, and cross links connecting the rock arms of each pair; a conventional steering mechanism for the forward pair of wheels including a steering column, a hand wheel at its upper end, a rock arm at its lower end, and a drag link connecting said rock arm to a rock arm of one of said ground wheels; a steering mechanism for turning the wheels of the rear pair in a direction opposite to that of said forward wheels, said mechanism including drag links respectively connected with said rock arm on said column and a rock arm of one of said rear wheels, and transmission means between the adjacent ends of said last mentioned drag links permitting a limited movement of the forward link in either direction from its neutral position while maintaining the rear link locked from movement, and communicating further movement from said forward link to said rear link.

4. In a vehicle, front and rear pairs of ground wheels, each wheel being mounted for angular movement about a substantially vertical axis and having an actuating rock arm therefor, and a cross link connecting the rock arms of each pair; a conventional steering mechanism for the forward pair of wheels including a steering column, a hand wheel at its upper end, a rock arm at its lower end, and a drag link connecting said rock arm to a rock arm of one of said ground wheels; a steering mechanism for turning the wheels of the rear pair in a direction opposite to that of said forward wheels, said mechanism including drag links respectively connected with said rock arm on said column and a rock arm of one of said rear wheels, and a substantially irreversible transmission means between the adjacent ends of said last mentioned drag links permitting a limited movement of the forward link in either direction from its neutral position while maintaining the rear link locked from movement with the wheels in a straight ahead position, said transmission means on further movement of said forward link communicating motion to said rear link.

5. In a vehicle, front and rear pairs of ground wheels, each wheel being mounted for angular movement about a substantially vertical axis and having an actuating rock arm therefor, and a cross link connecting the rock arms of each pair; a conventional steering mechanism for the forward pair of wheels including a steering column, a hand wheel at its upper end, a rock arm at its lower end, and a drag link connecting said rock arm to a rock arm of one of said ground wheels; a steering mechanism for turning the wheels of said rear pair in a direction opposite to that of said forward wheels, said mechanism including drag links respectively connected with said rock arm on said column and a rock arm of one of said rear wheels, and a substantially irreversible transmission means between the adjacent ends of said last mentioned drag links comprising a casing, a pair of parallelly arranged shafts journaled therein, a cam on one of said shafts having a concentric portion and an eccentric portion, a yoke on the other shaft embracing said cam to be locked from movement by the concentric portion thereof and actuated by the eccentric portion, said transmission means being adapted to hold said rear wheels in straight ahead position during a limited angular adjustment of said forward wheels in either direction and communicate angular movement to said rear wheels in a direction opposite to the movement of said forward wheels upon further angular movement of the latter.

HARPER E. PULLEYBLANK.